United States Patent Office 3,186,283
Patented June 1, 1965

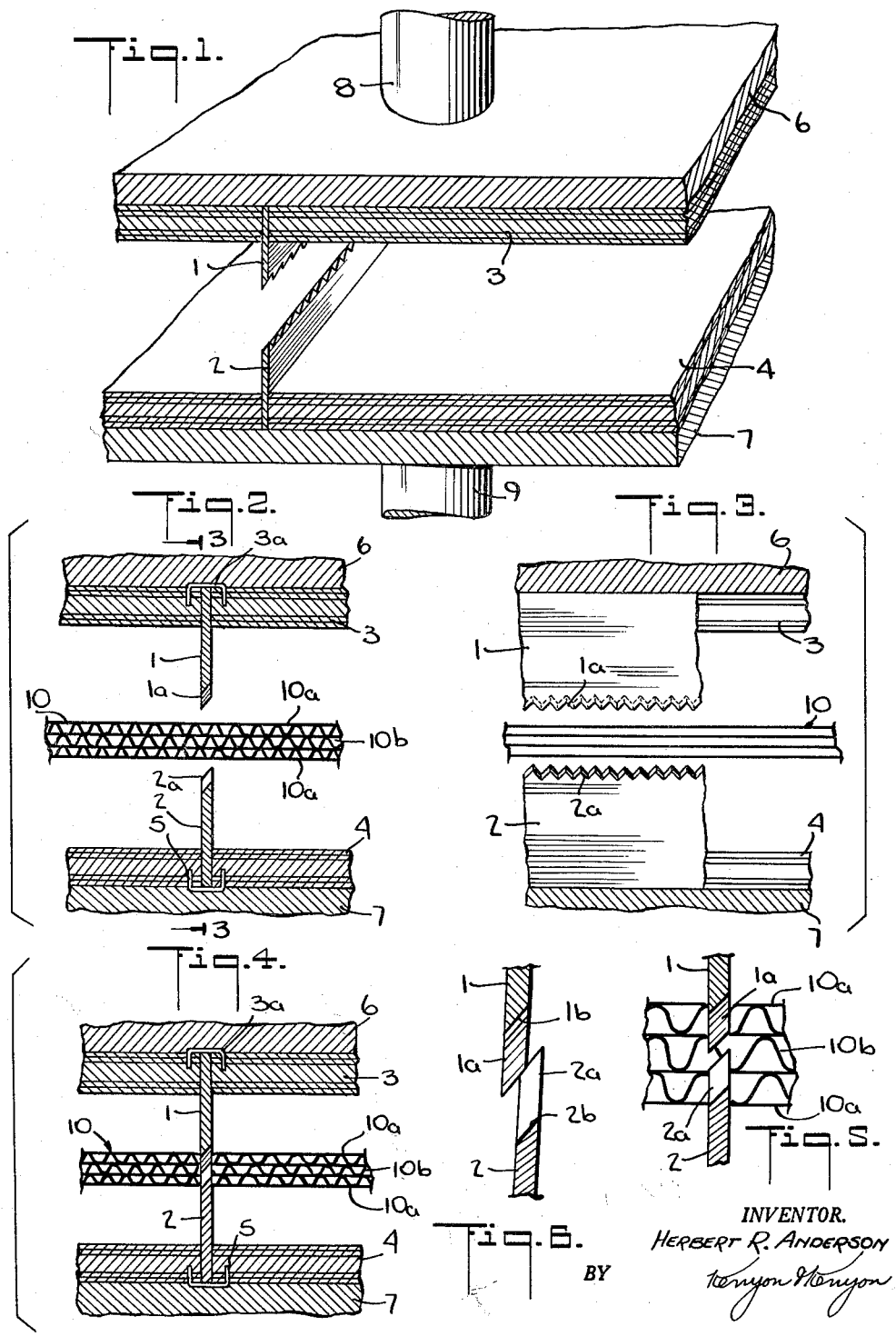

3,186,283
STEEL RULE DIE CUTTER FOR CUTTING
CRUSHABLE MATERIALS
Herbert R. Anderson, Massapequa, N.Y., assignor to Tri-Wall Containers, Inc., New York, N.Y., a corporation of New York
Filed Jan. 25, 1961, Ser. No. 84,832
4 Claims. (Cl. 83—623)

This invention relates to steel rule die cutters and a process for cutting triple-wall corrugated paperboard and other multi-layered thick and easily crushed materials.

A steel rule die cutter ordinarily comprises a bed on which the die is placed and a platen or roller which is used to press the work against the bed. The die is formed from one or more lengths of steel rule which is simply a thin and therefore flexible straight-edged steel strip. This rule is flexible so that it may be curved as desired to provide the desired cutting pattern and it is mounted on edge by being clamped in correspondingly cut plywood or the like. This die is placed on the previously mentioned bed so that the platen or roller can press the work downwardly to make the cut. Sponge rubber or the like is mounted on the plywood so as to be compressed by the work during the cutting and thereafter spring upwardly and strip the work from the steel rule.

Such a steel rule die cutter is used to cut various paperboard products and as long as such products are not subject to crushing too easily satisfactory cutting is obtained. However, in the case of triple-wall corrugated paperboard, thick stacks of single or double wall corrugated paperboard, and the like, the material being cut is crushed badly out of shape along the areas adjacent to the edge of the steel rule against which this material is pressed. In addition difficulties are experienced in connection with properly stripping the work from the steel rule die.

With the foregoing in mind one of the objects of the present invention is to provide an improvement in the steel rule die cutter field, and an improved cutting process, whereby to enjoy the flexibility and other advantages inherent to the use of a steel rule and in addition to die-cut crushable work of the character described without crushing the work adjacent to the line of cut in the objectionable manner inherent to the use of prior art steel rule die cutters. Other objects may be inferred from the following disclosure of a specific example of the invention, this being illustrated by the accompanying drawings in which:

FIG. 1 is a partial view which partly in perspective and partly in section shows a steel rule die cutter embodying the principles of the present invention;

FIG. 2 is a side view of the cutter, which is shown in section, starting to cut a piece of triple-wall corrugated paperboard;

FIG. 3 is a cross section taken on the line 3—3 in FIG. 2 and located to show the steel rule dies in elevation;

FIG. 4 corresponds to FIG. 2 but illustrates the actual cutting of the triple-wall corrugated paperboard;

FIG. 5 is a sectional view showing on an enlarged scale a particular phase of the cutting action of the steel rule dies embodying the present invention; and FIG. 6 corresponds generally to FIG. 5 but shows an action resulting when the steel rule dies overtravel.

Referring first to FIG. 1 in the case of the present invention cooperating upper and lower steel rules 1 and 2 respectively are used, as contrasted to the ordinary procedure of using only one rule and pressing the work against this rule. The upper die is formed by mounting the rule 1 between appropriately patterned plywood 3 which clamps the rule as by means of the plywood sections being interconnected by staples 4. Correspondingly the lower rule 2 is mounted by plywood sections 4 clamped together as by the use of staples 5.

In this invention both the upper and lower dies move together as they are shown mounted respectively by upper and lower platens 6 and 7 each provided with means for moving them simultaneously together, such means being indicated as reciprocative rams 8 and 9 which may be suitably powered as by working in hydraulic cylinders or the like. The latter may be conventional and therefore are not shown.

Contrasting with the conventional straight-edged steel rule, each steel rule of the present invention has cutting edges formed by a plurality of teeth 1a and 2a for the upper and lower rules 1 and 2 respectively. These two rules when mounted as shown to form a die are mutually opposed and of course move vertically linearly in the same vertical plane. The teeth of one die meshes with the teeth of the other when the two dies are moved to mutually abutting relation as shown in FIG. 4. The platens 6 and 7 and their respective operating rams 8 and 9 provide a means for moving the dies linearly towards and from their mutually abutting relation.

The cutting edges of the dies, formed by the appropriately contoured and mounted steel rules, are oppositely beveled as at 1b and 2b respectively, in the case of the dies or rules 1 and 2. The rules project far enough beyond their mounts 3 and 4 to have a transversely springy action, the rules being of course relatively thin. Therefore, if through lack of adequate control of the rams 8 and 9, for instance such as might occur when setting up and adjusting the equipment at the start of operations, the dies are caused to overtravel beyond their abutting relationship, the beveled edges cause the rules or dies to wedge each other transversely apart without substantial damage to each other such as might render them inoperative. This action is shown by FIG. 6. Therefore, any possible objection to the use commercially of the upper and lower rules or dies moving simultaneously towards each other is overcome. Such a problem is of course not encountered in the case of the conventional steel rule die cutter.

Conventional controls may be used for causing the rams 8 and 9 to reciprocate substantially equally with respect to each other. Designers of both hydraulic and mechanical pressers can easily provide such controls. They should be able to provide sufficient accuracy and precision to prevent overtravel of the rules or dies. However, the equipment must be adjusted by the operator and this leaves room for overtravel trouble which is rendered relatively harmless as described above.

As shown by both FIGS. 1 and 3 the teeth are in the form of a series of mutually proximate V-shapes. The teeth series of the upper rule or die are offset laterally the distance of half a tooth relative to the teeth series of the lower rule or die 2. This is to provide the intermeshing previously described. The bevels of the cutting edges of the respective teeth are opposite to each other in angularity, again as required to provide perfect intermeshing of the respective teeth. All of the teeth have the same size.

The operation of the new cutter inherently provides a new process for cutting material of the character described and although this process might be practiced by other means the use of the apparatus shown automatically provides the process steps.

As illustrated by FIG. 2, the operation is started by placing the material 10, shown as being a piece of triple-wall corrugated paperboard, between the upper and lower dies 1 and 2 which are separated by retraction of the rams 8 and 9. Then the rams are moved simultaneously together equi-distantly with respect to the material or work 10. As the tips or points of the teeth 1a and 2a encounter the cutter liners 10a of the triple-wall these points stab these opposite sides of the material along mutually opposite and registered predetermined cutting lines formed by the orientation and mutual alignment of the two rules. This stabbing occurs at a plurality of points spaced along the mentioned lines to initially perforate the sides of the material which are in this instance the liners 10a. As the rams 8 and 9 continue to move towards each other this stabbing effect occurs continuously inwardly to perforate the succeeding layers of the triple-wall while applying a guillotine type cutting action progressively from one previously formed perforation to another. In this fashion continuous lines of severance are gradually formed. Actions of this type are always somewhat difficult to describe. In any event it can be seen that there is an initial piercing, penetration or stabbing by very sharp points followed by a slicing action occurring by sharp cutting edges, formed by the sides of the teeth, with this slicing action effected by sharply angled cutting edges providing smooth and clean severance without exerting enough pressure to deform the various layers of the material as the action proceeds.

As the perforating teeth points reach the middle corrugated media 10b of the triple-wall used to illustrate the operation, this media is provided with a line of perforations initially and at a time when all of the rest of the layers have been completely severed by the previously described slicing action. Therefore, in some instances it may be desirable to at this time terminate the advances of the rams 8 and 9 and retract both of them. Thereafter complete severance of the triple-wall may be effected easily by tension in the same manner that stamp and other products joined together by lines of perforation may be separated. This has an advantage in some manufacturing operations. The action just described is illustrated by FIG. 5 where the upper and lower dies or rules are shown at what is in this instance the limits of their mutual approach.

Otherwise the advances of the two rams are continued until the teeth of the respective rules or dies completely intermesh and mutually abut in the fashion shown by FIG. 4. In this case complete severance of all of the layers of the triple-wall is effected. It can be seen that the degree to which this condition is approached depends on the degree required for the ultimate severance of the material. In other words, the inner layer or layers of the material may be either completely severed or only perforated for subsequent severance when pulled apart.

Triple-wall corrugated paperboard is used to illustrate the operation of this invention because this material has such uniquely great strength as compared to any other paperboard product of comparable weight. This strength is due to the geometry and integrity of this product as a whole. Any crushing action along the line of severance destroys one or the other or both of these values and is in any event a serious objection if only from the standpoint of appearance. With the present invention the initial penetration of the sharply tapered teeth is at points, thus permitting penetration without subjecting the surrounding areas of the paperboard to sufficient pressure to cause crushing adjacent to the cut. This initial penetration eases the subsequent action involving a smooth slicing gradually from one initially formed perforation to another. Here again the pressure transmitted to the surrounding areas of the triple-wall is very slight and insufficient to cause crushing.

In addition to the above inherent advantages there is the further advantage that each rule or die must penetrate only one-half way through the material being cut. This reduces any tendency towards crushing of the layers of the material. Furthermore, when the dies are moved apart they move apart equally and in opposite directions so that the material or work is automatically stripped from the two dies. This presupposes an exactly equal frictional engagement between the two rules or dies and the cut material. Although this condition possibly cannot be relied on during commercial operations, the self-stripping tendency exists at all times. Therefore, if sponge rubber strippers are used along the lines commonly employed by steel rule die cutters, they may be made more easily compressible than is customary. Their only job need be to overcome the slight differences that might exist between the frictional engagements of the upper and lower rules or dies with the work.

The elimination of the strongly elastic sponge rubber strippers ordinarily required is another reason why with the present invention less crushing pressure is applied to the crushable material being cut. Such material may not be only triple-wall corrugated paperboard but might be relatively thick stacks of single-wall or double-wall corrugated paperboard. The invention is in general applicable to any easily crushable material although this is usually in the form of interspaced multiple layers, cells which space layers apart, cellular material and the like. Ordinariy such material is non-metallic although the principles of this invention may prove applicable even in the case of metallic materials.

I claim:

1. A steel rule die cutter comprising mutually opposed and parallelly aligned steel rule dies each having cutting edges formed by a plurality of pointed teeth triangular in form with the teeth of one die meshing with the teeth of the other when said dies are moved to mutually abutting relation, and means for moving said dies linearly towards and from said relation, said cutting edges extending along each edge portion of each of said teeth from one pointed portion to the base portion thereof, said cutting edges of each of said teeth being beveled toward one another, the beveled edges of one die being substantially complementary to those of the other die, and said dies being transversely springy so that they wedge each other transversely apart without substantial damage to each other in the event they overtravel when moved by said means towards said relation.

2. A steel rule die cutter comprising mutually opposed and parallelly aligned steel rule dies each having cutting edges formed by a plurality of teeth with the teeth of one die meshing with the teeth of the other when said dies are moved to mutually abutting relation, the teeth of each die having points disposed adjacent the cutting edges thereof and substantially in a plane offset from the points of the teeth in the other die, the teeth of each die having cutting edges extending from the points thereof in a plane offset from the cutting edges of the other die, and means for moving said dies linearly towards and from said relation, with substantially equal reciprocation of each of said dies so that when said dies are moved apart they tend to strip themselves from work cut thereby.

3. A steel rule die cutter comprising mutually opposed and parallelly aligned steel rule dies each having cutting edges formed by a plurality V-shaped teeth with the teeth of one die meshing with the teeth of the other when said dies are moved to mutually abutting relation, and means for moving said dies linearly towards and from said relation, with substantially equal reciprocation of each of said dies so that when said dies are moved apart they tend to strip themselves from work cut thereby, said cutting edges extending along each edge portion of each of said teeth from the apex portion of said V-shaped tooth to the base portion thereof, said cutting edges being beveled toward one another, the beveled cutting edges of one die being substantially complementary to those of the other die, and said dies being transversely springy so that they wedge each other transversely apart without substantial damage to each other in the event they overtravel when moved by said means towards said relation.

4. A steel rule die cutter comprising a pair of platens each having a plane surface disposed parallel and in a facing relationship with that of the other, mutually opposed and parallelly aligned steel rule dies each mounted as a cantilever extending at right angles with respect to a different one of said platens and having cutting edges formed by a plurality of pointed teeth with the teeth of one die meshing with the teeth of the other when said dies are moved to mutually abutting relation, and means for actuating said platens to move said dies linearly towards and from said relation, with substantially equal reciprocation of each of said dies so that when said dies are moved apart they tend to strip themselves from work cut thereby said cutting edges extending along each edge portion of each of said teeth from the pointed portion thereof to the base portion thereof, said cutting edges of each of said teeth being beveled toward one another, the beveled edges of one die being substantially complementary to those of the other die, and said dies being transversely springy in the portion of each extending beyond said platens so that they wedge each other transversely apart without substantial damage to each other in the event they overtravel when moved by said means towards said relation, said teeth being in the form of a series of mutually proximate V-shapes.

References Cited by the Examiner

UNITED STATES PATENTS

| | | | |
|---|---|---|---|
| 122,260 | 12/71 | Lake | 83—49 |
| 906,619 | 12/08 | Drill | 156—346 |
| 1,716,991 | 6/29 | Turner | 83—51 |
| 2,233,000 | 2/41 | Chesley | 83—49 |
| 2,825,405 | 3/58 | Maass | 83—623 |
| 2,926,557 | 3/60 | Ford | 83—623 |
| 3,059,506 | 10/62 | Linzell et al. | 76—107 |

FOREIGN PATENTS 451,389  8/36  Great Britain.

ANDREW R. JUHASZ, *Primary Examiner.*

CARL W. TOMLIN, *Examiner.*